US007659887B2

(12) United States Patent
Larsen et al.

(10) Patent No.: US 7,659,887 B2
(45) Date of Patent: Feb. 9, 2010

(54) KEYBOARD WITH A TOUCHPAD LAYER ON KEYS

(75) Inventors: Glen C Larsen, Issaquah, WA (US); Steven N Bathiche, Kirkland, WA (US)

(73) Assignee: Microsoft Corp., Redmond, WA (US)

( * ) Notice: Subject to any disclaimer, the term of this patent is extended or adjusted under 35 U.S.C. 154(b) by 622 days.

(21) Appl. No.: 11/254,355

(22) Filed: Oct. 20, 2005

(65) Prior Publication Data

US 2007/0091070 A1    Apr. 26, 2007

(51) Int. Cl.
*G06F 3/02* (2006.01)
(52) U.S. Cl. ............................ 345/170; 345/172; 341/21
(58) Field of Classification Search .......... 345/156–172; 463/34–42; 341/21–23
See application file for complete search history.

(56) References Cited

U.S. PATENT DOCUMENTS 5,481,278 A * 1/1996 Shigematsu et al. ......... 345/179
5,675,361 A * 10/1997 Santilli ........................ 345/168
6,037,929 A * 3/2000 Ogura et al. ................. 345/168
6,288,707 B1 * 9/2001 Philipp ........................ 345/168
6,337,678 B1 * 1/2002 Fish ............................ 345/156
7,368,855 B2 * 5/2008 Orten .......................... 310/328
2003/0210232 A1 * 11/2003 Chen ........................... 345/168
2006/0066566 A1 * 3/2006 Law ............................ 345/156
2006/0238510 A1 * 10/2006 Panotopoulos et al. ...... 345/168

\* cited by examiner

*Primary Examiner*—Chanh Nguyen
*Assistant Examiner*—Ram A Mistry
(74) *Attorney, Agent, or Firm*—CapitolCity TechLaw; Richard C. Irving

(57) ABSTRACT

Various embodiments are disclosed relating to a keyboard with integrated key and touchpad. In an example embodiment, a keyboard is provided that includes a plurality of keys, each key being capable of being pressed to select one or more keyboard inputs. The keyboard also includes a micro touchpad provided on an upper surface of a first key of the keys to allow pointer control by moving a finger or other object across a top surface of the micro touchpad.

14 Claims, 4 Drawing Sheets

KEYBOARD WITH A TOUCHPAD LAYER ON KEYS

BACKGROUND

Keyboards and pointing devices are common input devices for computers, laptops, cell phones, PDAs (personal digital assistants) and other electronic devices. Mice, track points and touchpads are some common types of pointing devices. There have been several efforts to incorporate computer cursor or pointer control (mouse functions) into a keyboard. Many of these attempts have been made on a laptop and typically include a resistive or capacitive touchpad located below the spacebar, or provide a track point (or mini-joystick) pointing device between the keys on the keyboard. There has even been an attempt to provide a mini joystick or track point within a spacebar key as a pointing device. Some of these techniques can be inconvenient and difficult to learn because they may require an interrupting motion by the user to move the fingers or hand from a resting or home position on the keyboard to the location of the pointing device, which may be a significant change in the user's typing behavior.

SUMMARY

Various embodiments are disclosed relating to a keyboard with integrated key and touchpad. In an example embodiment, a keyboard may be provided that includes a plurality of keys, each key capable of being pressed (or actuated) to select one or more keyboard inputs. The keyboard may also include a micro (or miniature) touchpad provided on an upper surface of a first key of the keys to allow pointer control by moving a finger or other object across a top surface of the micro touchpad.

According to another example embodiment, a keyboard may be provided that includes a plurality of keys, each key capable of being pressed to select one or more keyboard inputs. The keyboard may also include a micro touchpad provided on an upper surface of a first key of the keys, the micro touchpad being adapted to allow at least small-scale pointer control by moving a finger or other object across a top surface of the micro touchpad. The keyboard may further include a macro touchpad including a touch sensor provided on an upper surface of each of a plurality of the keys, the macro touch pad being adapted to allow at least large-scale pointer control by moving a finger or other object across a top surface of one or more the plurality of keys of the macro touchpad.

According to another example embodiment, a method of selecting touchpad input and key input may be provided. The method may include determining if a key has been pressed, and determining if touch activity is detected. If a key has been pressed, then key input may be enabled and touch input may be disabled for a period of time after each key has been pressed. Otherwise, if a key has not been pressed, then touch input may be enabled. Also, if a key has not been pressed and if touch input is detected, then key input may be disabled.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
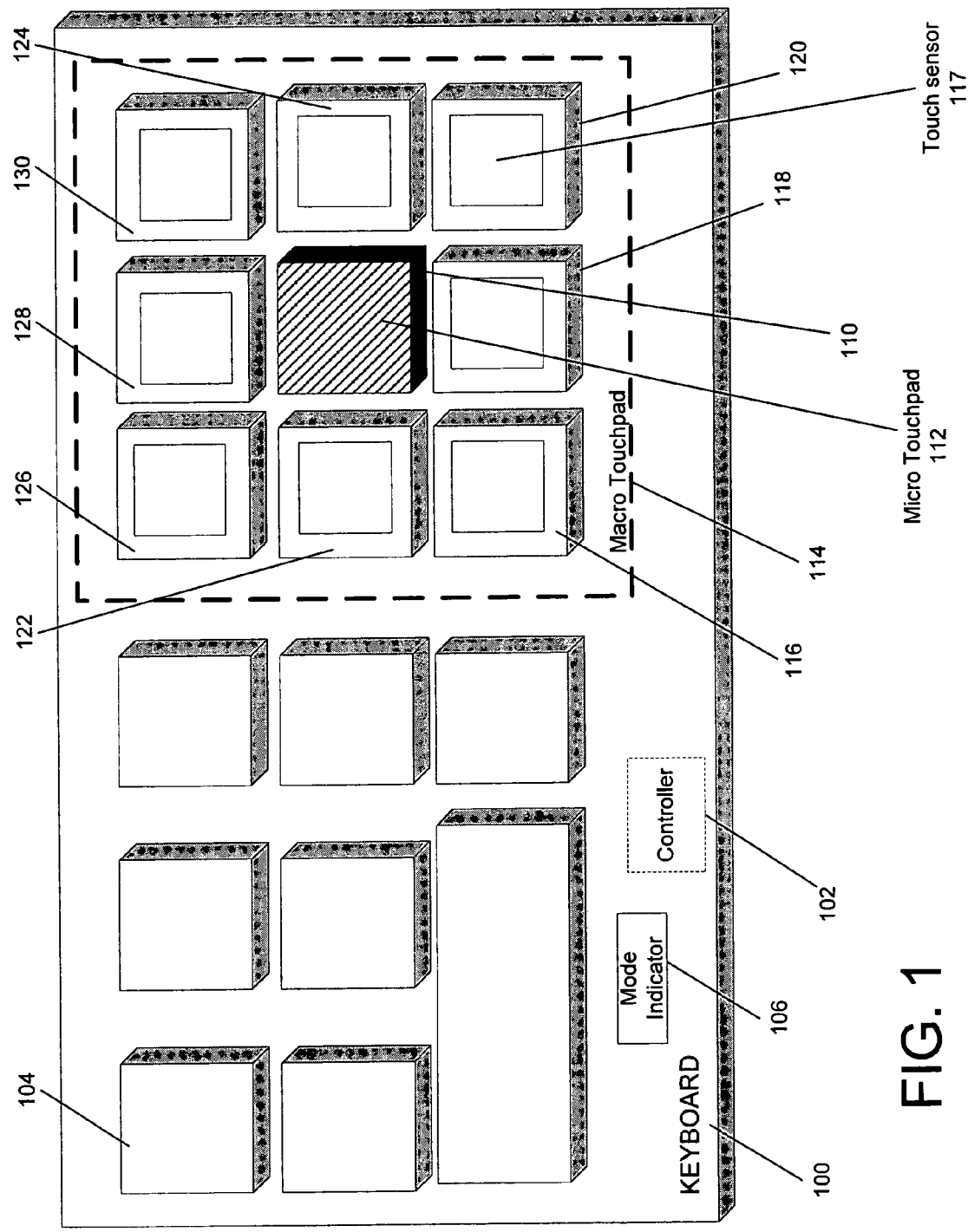
FIG. 1 is a block diagram of a keyboard 100 according to an example embodiment.

Referring to the Figures in which like numerals indicate like elements, FIG. 1 is a block diagram of a keyboard 100 according to an example embodiment. Keyboard 100 may be any type of keyboard, such as a keyboard for a personal computer (PC), laptop, cell phone or personal digital assistant (PDA) or other device. A keyboard controller 102 may be provided within keyboard 100 to perform various electronic functions related to keyboard 100, such as receiving and identifying data (e.g., from pressed keys or other input), and forwarding data to another processor or controller (e.g., host processor), not shown, for display or processing.

Keyboard 100 may include a number of keys, such as key 104. Each key on keyboard 100 may be pressed (or actuated), for example, to select or input a specific keyboard input, such as a character, letter, number, control input, etc. Any type of key may be used. In an example embodiment, one or more (or even all) of the keys of keyboard 100 may be capable of traveling a distance (key displacement) of at least 0.1 mm, or of at least 0.2 mm, or of at least 0.3 mm between a pressed (or down) position to a not pressed (or up) position. Having keys in a keyboard that may travel a significant distance, such as greater than 0.1 mm, or greater than 0.2 mm, or greater than 0.3 mm for example, may provide a more expected conventional or natural keyboard feel for the user when typing, although this is not required. In other embodiments, one or more (or even all) of the keys on the keyboard 100 may be capable of traveling at least 1 mm, or in other embodiments, at least 2 mm or more (between pressed and not pressed positions), although such a minimum travel distance for keys is not required according to an example embodiment.

According to an example embodiment, a key 110 may include a micro (or miniature) touchpad 112 on an upper surface of key 110 to allow pointer or cursor control or movement by moving (or dragging) a finger or other object across a top surface of the micro touchpad 112 (by moving the finger across the top surface of the key 110). By integrating a micro touchpad 112 within a surface of key 110 on keyboard 100, a more convenient interface may be provided since the user may not necessarily be required to move his/her fingers or hand from their home or ordinary position on the keyboard when controlling or moving a pointer or cursor or performing mouse type functions.

Micro touchpad 112 may be any type of touchpad, which are generally well known (e.g., capacitive, resistive, or electromagnetic touchpads). For example, micro touchpad 112 may be a capacitive touchpad, which may typically include a two-dimensional grid of intersecting conductive traces in the X and Y directions. When a finger or object contacts the touchpad, a control circuit, such as controller 102, may determine the touched position on the touchpad by sensing a change in capacitance in both the X and Y directions, for example. Other types of touchpads may be used for micro touchpad 112.

Micro touchpad 112 may, for example, include an N×M touchpad, where N and M may indicate the number of X and Y direction conductive traces, respectively. For example, micro touchpad 112 may provide 2 traces in the X direction and 2 traces in the Y direction (2×2), 5 traces in the X direction and 5 traces in the Y direction (5×5), 10 traces in the X direction and 10 traces in the Y direction (10×10), 20 traces in the X direction and 20 traces in the Y direction (20×20), 50 traces in the X direction and 50 traces in the Y direction (50×50), or any number of traces. To provide significant control and precision in a pointer control on a small area of a single key, the micro touchpad may have, for example, a resolution of at least 10×10, but other resolutions may be used. Therefore, a N×M micro touchpad 112, which may be significant or high resolution (e.g., 20×20, or 50×50, or greater), may be provided in an upper surface of a key 110, where key 110 may be, for example, approximately one inch by one-half inch (½"×½") or, for example, 18 mm×18 mm, although other sized keys may be used. In other embodiments, higher resolution micro touchpads may be used to provide greater precision and pointer control, and in other applications, lower resolution touchpads may be used.

According to an example embodiment, micro touch pad 112 may be provided on the H key, the J key, the F key (e.g., for index finger control of the pointer), the G key, or the space bar key (e.g., for thumb control), as examples. However, micro touch pad 112 may be provided on any key.

In addition, a micro touchpad 112 may be provided on each of a plurality (or even all) of keys on keyboard 100. For example, a micro touchpad may be provided on an upper surface of a first key to allow pointer control by moving a finger or other object across a top surface of the micro touchpad of the first key. Another micro touchpad may be provided on an upper surface of a second key on keyboard 100 to allow scrolling (for example) control by moving a finger or other object across a top surface of the micro touchpad of the second key. In one example embodiment, the first key (e.g., having a micro touch pad thereon for pointer control) and/or the second key (e.g., having a micro touchpad thereon for scrolling, cursor control or other control) may include the F key, the H key, the J key, or the space bar, as examples. In another embodiment, the first key (e.g., having touchpad for pointer control) may be the H key or J key, and the second key (e.g., having touchpad for scrolling, cursor control) may be the F key or the G key, for example. Many other keys and key combinations may be used for one or more micro touchpads.

Keyboard 100 (FIG. 1) may also include a mode indicator 106, which may indicate when keyboard 100 is operating in key mode (e.g., where keyboard has detected key input and may disable one or more touchpads on keyboard 100 and enable key input) or a touchpad mode (e.g., in which keystroke or key inputs may be disabled and inputs. from touchpads on keyboard 100 may be enabled). Indicator 106 may be a visual indicator such as a light, or multiple lights or LEDs (light emitting diodes) indicating a keyboard mode (e.g., key mode or touchpad mode). Indicator 106 may include another type of indicator such as an audio or tactile indicator (e.g., physical indicator, which may vibrate or move to indicate mode). The indicator may also be located on a remote display, such as the monitor or display of a personal computer, or a cell phone screen, or other display. In addition, a key on keyboard 100 may be used to allow a user to manually select a keyboard mode, for example, to toggle between key mode and touchpad mode (or touch mode).

According to another embodiment, as shown in FIG. 1, a macro (or multi-key) touchpad 114 may be provided including a touch sensor provided on an upper surface of each of a plurality of keys on keyboard 100. For example, macro touchpad 114 may include touch sensors provided on each of keys 116, 118, 120, 122, 124, 126, 128 and 130. For example, a touch sensor 117 may be provided on an upper surface of key 120, as shown in FIG. 1. Other keys within macro touchpad 114 may similarly include a touch sensor thereon, as shown. Macro touchpad 114 may include any number of keys, e.g., all the keys on keyboard 100, or a subset of the keys of keyboard 100. While the touch sensors are illustrated in FIG. 1 as being slightly smaller (in area) than the surface of each key, the touch sensors may be any size, and may have a size or area that matches the upper surface of the key, for example. Macro touchpad 114 may provide a touchpad for pointer control, cursor control or other control by allowing a user to move his/her finger across one or more keys within the macro touchpad 114. Macro touchpad 114 may include key 110/ micro touchpad 112 as well.

Each touch sensor (e.g., touch sensor 117 on key 120) may be any conventional touch sensor, or sensor to detect touch or contact to the key. In one example embodiment, one or more of the touch sensors may be a micro touchpad (e.g., N×M touchpad). A touch sensor, in a very simple embodiment, may even be a 1×1 micro touchpad for example, which may be, for example, a single capacitive sensor (rather than multiple traces or cells per key). In example embodiments, each of the touch sensors, if provided as a micro touchpad, may be the same resolution (N×M) as micro touchpad 112, or may be a different resolution than touch pad 112. For example, micro touchpad 112 on key 110 may have a resolution of 100×100, or 50×50, or 30×30, or 25×25, or 20×20, or 10×10 (as examples), while the micro touchpads (touch sensors) for the other keys (116, 118, 120, 122, 124, 126, 128 and 130) of macro touchpad 114 may have a lower resolution, such as a resolution of 1×1, 2×2, 3×3, 5×5 or 10×10, as examples. These are just a few examples and the disclosure is not limited thereto.

In an example embodiment, micro touchpad 112 on key 110 may be adapted to allow at least small-scale (e.g., relatively short distance) and/or precise (or fine) pointer control (e.g., under an index finger or adjacent to an index finger) due to the small size and relatively high resolution of micro touchpad 112, for example. For example, a user may be able to accurately move the pointer to a specific location using micro touch pad 112, but due to the relatively small size of touchpad 112, in some cases it may take several clutches or swipes (e.g., finger lift and retrace across micro touchpad 112) to move the pointer across a significant portion of the screen distance (e.g., across the entire display screen), according to an example embodiment. Although in other embodiments, micro touchpad 112 may allow a user to move a pointer a significant distance across a screen in one swipe.

Therefore, a larger macro touchpad 114 (e.g., provided across multiple keys) may be provided as well, and may include either touch sensors and/or micro touch pads for each of a plurality of keys (or even all of the keys) to allow, for example, at least large-scale (e.g., relatively longer distance) or gross pointer control by moving a finger or other object across a top surface of touchpads or touch sensors of multiple keys in macro touchpad 114. According to an example embodiment, a combination of a (e.g., high resolution) micro touchpad on a single key and a macro touchpad spanning across multiple keys may provide a convenient touchpad system that provides both precise or fine pointer control over short distances (e.g., via a single key micro touchpad 212) and allows gross pointer control or pointer control over longer distances (e.g., via macro touchpad 114).

The use of a keyboard 100 having an integrated key or (keys) and touchpad(s), such as described above, may be useful for a variety of applications. Such a keyboard with integrated key and touchpad may enable cursor control, typically performed on a mouse. Other example applications for such a keyboard may include vertical and horizontal scrolling, 3D rotation, CAD/CAM application control, document navigation, gaming applications, pressure sensitive input, multi-degree of freedom input. Another application for use with keyboard 100 may include computer control other than cursor control, such as finger-based gesture shortcuts for menu selections, e.g., drawing an "S" across micro touchpad 112 or across multiple keys of macro touchpad 114 to do a "File Save" command or menu pick.

According to another embodiment, the micro touchpad may be the size of a single key. A macro touchpad may include a micro touchpad on each of a plurality of keys, and movement may be detected by motion across the multiple keys or traveling between keys. Interpolation between keys may also be used to detect motion of touch between or across keys. In an example embodiment, a macro touchpad may include a touch sensor or micro touch pad on a set of keys, such as the 6, Y, H and N keys. This may be used for cursor control, scrolling, or for gestures. For example, a tapping on a key in the micro touchpad or macro touchpad may be used for gestures. For example, the user may tap on the Y key to scroll up and tap on the H key to scroll down. In addition, to scrolling and pointer control, the micro touchpad and/or macro touchpad may allow a user to perform other computer control, such as application switching, tabbing to a next prompt in an application, adjusting the volume, etc.

According to other example embodiments, keyboard 100 may also be useful for one or more output applications, or combined input/output applications. For example, an additional touchpad or touch sensor or thin film device may be provided on one or more keys to provide tactile feedback to the user, such as, for example, providing a piezoelectric vibration strip or a thermal strip (to increase or decrease temperature) on one or more keys. For example, these type of tactile sensors may allow the user to receive tactile or physical indication of a certain event or occurrence, such as allowing the user to feel for document or page boundaries, or indicate section boundaries, to notify the user of certain document contents before they appear on the page or screen, or to provide physical or tactile feedback to a blind user of the keyboard, etc.

Figure 2:
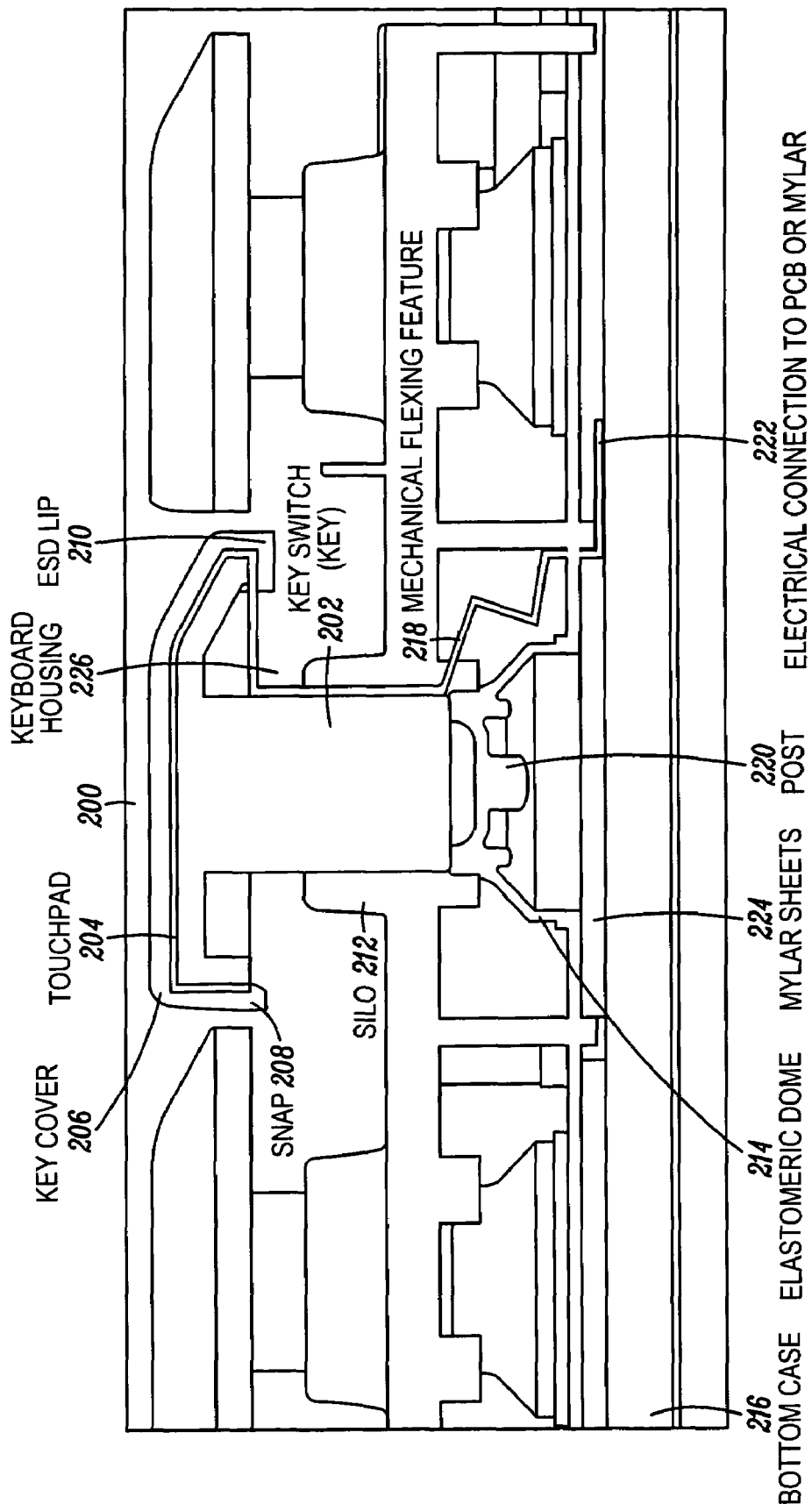
FIG. 2 is a schematic diagram illustrating a mechanical architecture of a key according to an example embodiment.

FIG. 2 is a schematic diagram illustrating a mechanical architecture of a key according to an example embodiment. Key 200 may include a key switch 202 which may move within a silo 212. Key 200 includes a micro touchpad 204 on an upper surface of the key or key switch 202. (A touch sensor may be provided in the key switch 202 in the same manner as micro touchpad 204). A key cover 206 may be provided over touchpad 204, and may include a snap 208. An insulative key cover 204 may be provided on an upper surface, a side surface and at least a portion of a lower surface of the key switch 202. A portion of insulative key cover 204 extending over an edge or lower portion of key switch 202 is shown in FIG. 2 as ESD (electro-static discharge) lip 210, which may assist in inhibiting electro-static discharge from the lower edge or lower surface of key switch 202. One or more (e.g., three) Mylar sheets 224 with conductive traces thereon may be provided. A bottom case 216 is provided beneath Mylar sheets 224.

The micro touchpad 204 may include a capacitive film, and may be insert molded into the top of the key switch 202, or assembled on the inside of key switch 202. By insert molding or top loading, the full top surface of the key (or full top surface of key switch 202) may be sensitized and available for finger tracking. The touch pad 204, which may be provided as a capacitive film for example, may be loaded from the top of the key with the touchpad film contacts passing through slots in the outer edge of the key and extending below with the key stem, or through a hole in the keyboard housing 226. A snap-on key cover 206, employing snap 208, may hold the capacitive film (touchpad 204) in place, or a top molding may be added as an additional operation to seal the key and touchpad. Alternatively, a sensor with a hole to surround the key stem may be assembled like a washer,, which may provide a simpler and less expensive solution and which may provide lower performance. The typical depression force required for key depression may not typically be increased by the addition of the micro touchpad 204, according to an example embodiment.

In one example embodiment, key switch 202 may be pressed, pushing against and partially collapsing elastomeric dome 214 so that conductive traces in different layers of Mylar sheets 224 are pushed together (shorted) by dome post 220 to provide an indication that key 200 has been pressed (or actuated) to keyboard controller 102 (FIG. 1). In addition, touch signals from micro touchpad 204 may be routed from touchpad 204 to keyboard controller 102 via a flexible conductor 218 (shown as mechanical flexing feature 218 in FIG. 2). Flexible conductor 218 may be routed along the outside of key switch 202 from touchpad 204, through keyboard housing 226 or key stem 212, to PCB (printed circuit board) or Mylar sheets 224, as shown in FIG. 2. Alternatively, the flexible conductor 218 may be routed within the (or internal to) key switch 202 and this internal routing arrangement (not shown) may, in some cases, decrease potential ESD problems. Also, in an example embodiment, carbon or other electrically conductive traces may be provided on the PCB beneath the key switch 202, or below dome post 220 to transfer signals from touchpad 204 to Mylar sheets 224, for example.

Due to movement or travel of key 200 (or key switch 202), which may be 0.1 mm or more, for example (e.g., 0.1 mm. 0.2 mm. 0.3 mm, 1 mm or 2 mm or more in some embodiments), flexible conductor 218, may include folds, bends, coils, curves or other structure to allow for flexing or bending of flexible conductor 218 during travel of key switch 202. Signals from keyboard controller 102 may be provided via wired or wireless communication to a host processor on a PC, laptop computer, cell phone, PDA, or other device, for example, for processing and/or display.

According to an example embodiment, additional control (e.g., hardware, software, and/or firmware which may be executed by keyboard controller 102 for example) may be provided to selectively enable and/or disable key input and/or touchpad (or touch) input. For example, a user may be typing and a finger may slide or move on touchpad 112 and this touch movement may be misinterpreted as a mouse or pointer movement. Therefore, according to one embodiment, a control system (e.g., software or firmware executed by keyboard controller 102, a host processor, or other controller) may disable touchpads 112 and 114 during typing, and may enable the touchpads after a predetermined period of time since a last keystroke. Also, in one embodiment, keystrokes (or key input) may be ignored if they occur within a given time period since touchpad activity was detected. Such a control system is not required, but may be helpful in some cases in reducing inadvertent pointer movements from the touchpad caused by, for example, unintentional index finger motion on the touch sensors or touchpads (112, 114). The operation of two additional example keyboard control systems are described in FIGS. 3 and 4.

Figure 3:
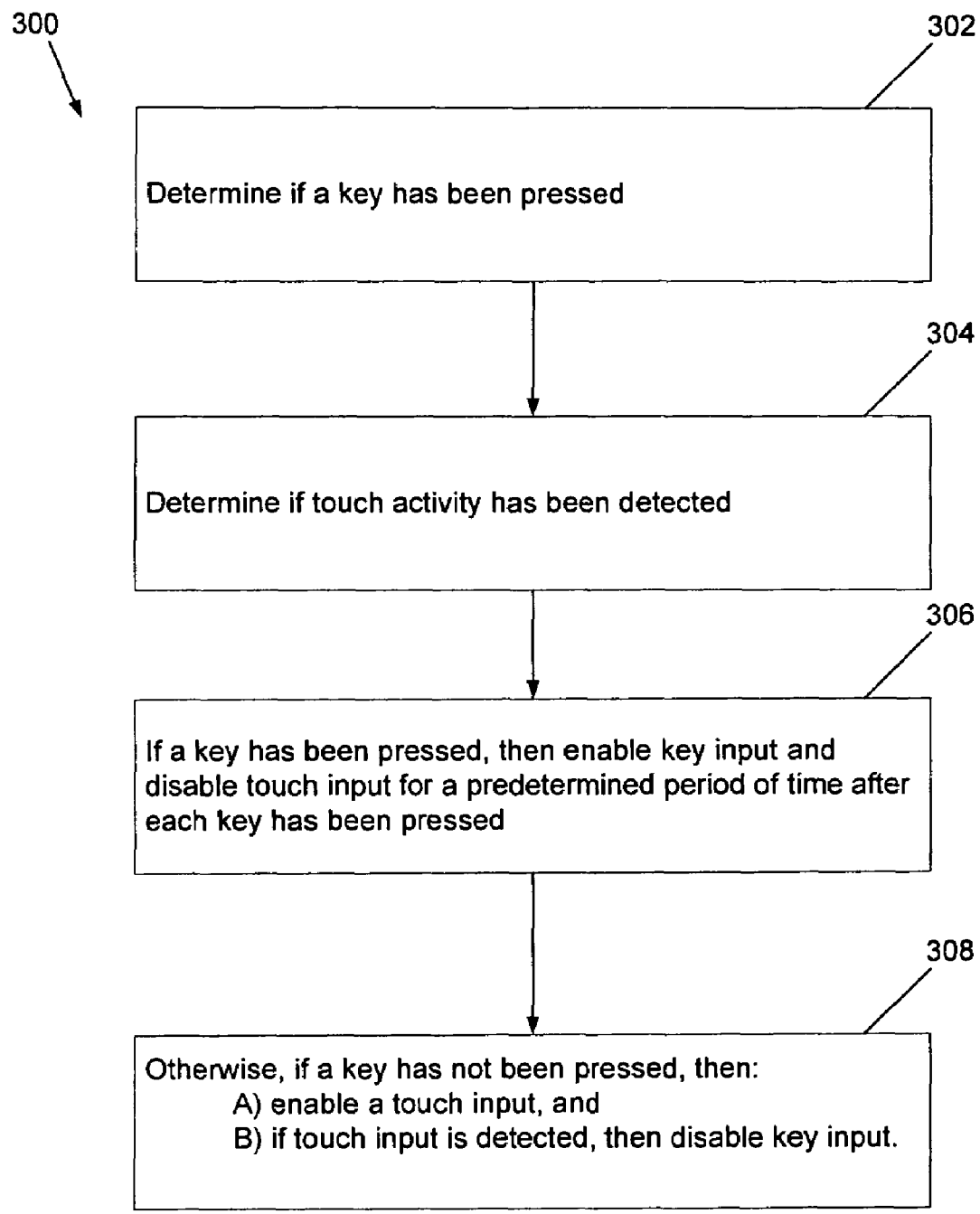
FIG. 3 is a flow chart 300 illustrating operation of a keyboard control system according to an example embodiment.

FIG. 3 is a flow chart 300 illustrating operation of a keyboard control system according to an example embodiment. First, it is determined if a key has been pressed (302). It is also determined if touch activity (e.g., at least slight pressure on a touchpad or touch sensor) is present (or has been detected) (304). If a key has been pressed, then key input may be enabled and touchpad (or touch) input may be disabled for a predetermined period of time after each key has been pressed (306). Otherwise, if a key has not been pressed, then the touch input may be enabled (308A). Also, in another example embodiment, if a key has not been pressed, then key input may also be disabled if touch activity is detected (308B).

Figure 4:
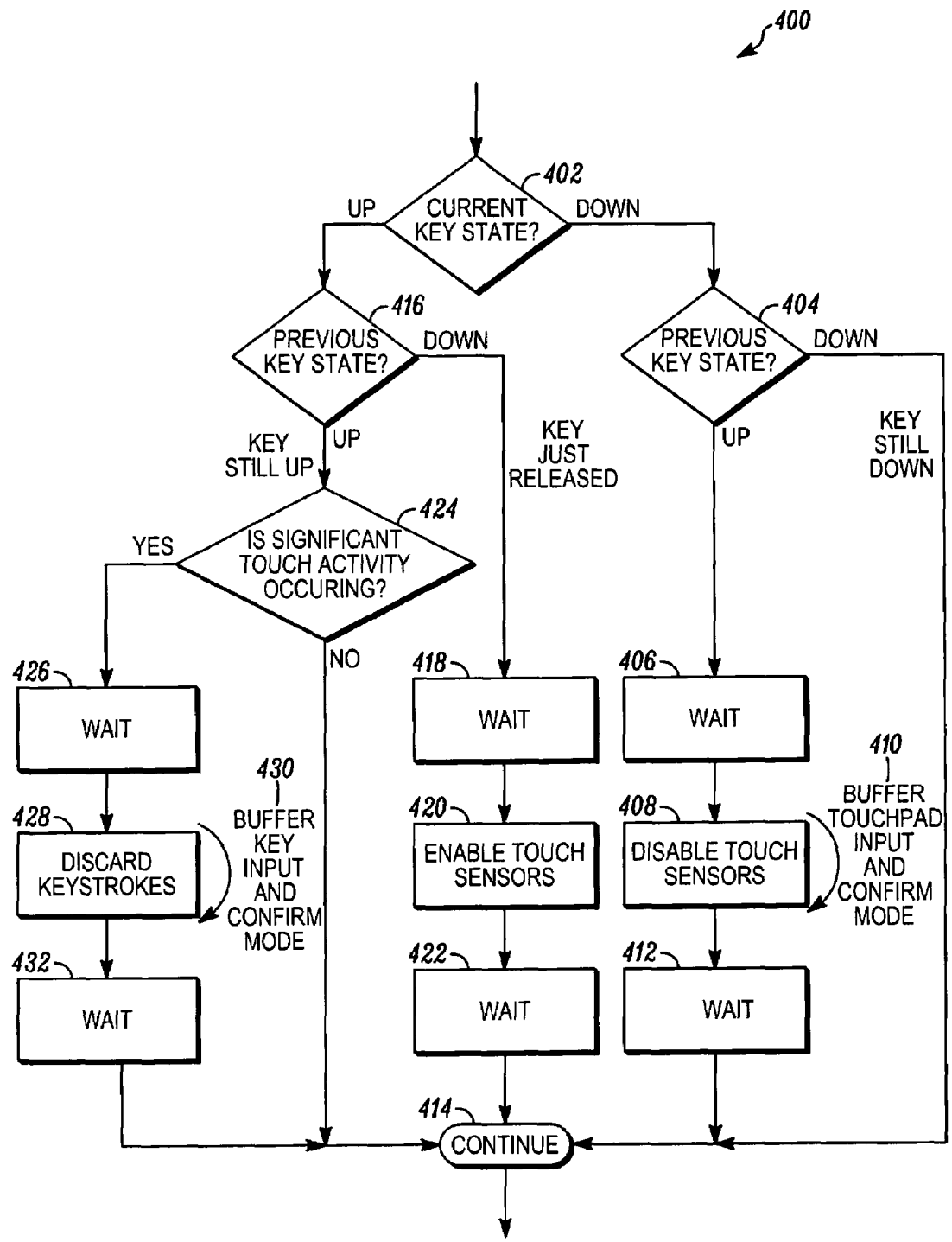
FIG. 4 is a flow chart 400 illustrating operation of a keyboard control system according to another example embodiment.

FIG. 4 is a flow chart 400 illustrating operation of a keyboard control method according to another example embodiment. A current key state may be determined (402) and may be buffered for subsequent comparison. In an example embodiment, key state may be determined periodically or every t seconds, for example. Key states may include, for example, down (pressed) and up (not pressed) states or positions. If the key is down, then flow proceeds to 404. The previous key state is determined (404). If the previous key state was down, then this indicates that the key is still down, and flow continues (414) back to 402. If the previous key state was up (404) (and current key state is down), this indicates that the key was just pressed and flow waits at 406 for a predetermined period of time before disabling touch input (408). The touch input (e.g., touchpad and/or touch sensor) may be disabled for a predetermined period of time after the key was pressed (shown as wait, 412).

Therefore, according to an example embodiment, when current key state is down, and previous key state was up, this may indicate that the keyboard is in the key mode (keystrokes), and may cause the keyboard to disable touch input for a predetermined period of time. However, the keyboard controller 102 (or other controller or processor), rather than disabling touch input, may merely temporarily buffer such touchpad and touch sensor input data (410) while keyboard controller 102 (or other controller or processor) may receive additional data (e.g., keystrokes, touchpad/touch sensor input or other information) to confirm that the keyboard should be in the key mode. Buffered data may, for example, either be used if appropriate, or may be discarded if not needed. Keyboard controller 102 may also consider by statistical methods or previous keyboard data, generally or for this specific user, to make decisions regarding automatic mode selection (e.g., determining when the key input or touch input should be enabled and disabled). Therefore, if keyboard controller 102 made an incorrect decision at 408 (e.g., it is determined that automatic mode selection selected an incorrect mode based on further data received by controller 102), the touch data may be enabled and the buffered data (buffered at 410) may be supplied to the host processor for processing or display.

If at 402 the current key state is up, then the previous key state is determined (416). If the previous key state was down, then this indicates that the key was just released, and the controller may wait (418) for a predetermined period of time before enabling touch input (420). These touch inputs may be enabled for a predetermined period of time (422), and then the process continues (414) back to 402.

If at 402 the current key state is up, and at 416 the previous key state was up, then this indicates that the key is still up. It is determined if any touch activity is occurring (424). If no touch activity is occurring, then the flow continues (414) back to 402. If significant touch activity is occurring, then the controller waits at 426, then discards any received keystrokes (disables key input) for a predetermined period of time (wait 432). In another embodiment, controller 102 may buffer (430) key (keystroke) input and confirm the keyboard mode that was selected. In this case, the controller 102 may receive further data or analyze statistical data, etc. to confirm that the keyboard mode selected (touch mode) was correct. If it was not correct (e.g., indicating that the keystroke data should not have been discarded), then the buffered keystroke data (buffered at 430) may be provided to the host processor for processing or display. The method described in FIG. 4 may be implemented, for example, in keyboard controller 102, a host processor, or some other processor or controller.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A keyboard comprising:
   a plurality of keys, each key capable of being pressed to select one or more keyboard inputs;
   a micro touchpad provided on an upper surface of a first key of said keys to allow pointer or other computer control by moving a finger or other object across a top surface of the micro touchpad; and
   a processor for controlling key input of the first key and touch input of the micro touchpad, the processor allowing the key input of the first key and temporarily buffering the touch input of the micro touchpad for a period of time after the first key is pressed, and the processor temporarily buffering the key input of the first key for a predetermined period of time after the touch input is detected via the micro touchpad of the first key and the first key has not been pressed, while temporarily buffering the key input of the first key due to the touch input being detected, the processor further attempts to confirm whether the key input should be disabled, if the processor does not confirm that the key input should be disabled, the processor disables the touch input and provides the buffered key input to a host processor, the host processor being different from the processor, and if the processor confirms that the key input should be disabled, the processor discards the buffered key input.

2. The keyboard of claim 1 wherein the first key is capable of traveling a distance of at least 1 mm between a pressed position and a not pressed position.

3. The keyboard of claim 1 and further comprising a keyboard controller coupled to the plurality of keys and the micro touchpad.

4. The keyboard of claim 1 and further comprising a micro touchpad provided on an upper surface of a second key of said keys to allow additional computer control by moving a finger or other object across a top surface of the micro touchpad of the second key.

5. The keyboard of claim 1 wherein the first comprises one of a G key, an H key, a J key, a F key or a space bar key.

6. The keyboard of claim 1 and further comprising a micro touchpad provided on an upper surface of a second key of said keys to allow scrolling control by moving a finger or other object across a top surface of the micro touchpad of the second key.

7. The keyboard of claim 6 wherein the first key comprises a first one of an F key, a G key, an H key, a J key or a space key and the second key comprises a second of the F key, the G key, the H key, the J key or the space bar key.

8. The keyboard of claim 6 wherein the first key comprises an H key or a J key, and the second key comprises an F key or a G key.

9. The keyboard of claim 1 and further comprising a flexible conductor coupled to the micro touchpad that is adapted to flex when the first key travel between a pressed position and a not pressed position.

10. The keyboard of claim 1 wherein the first key comprises an insulative key cover provided on at least one of an upper surface of the first key, a side surface of the first key or at least a portion of a lower surface of the first key.

11. The keyboard of claim 1, further comprising:
    a macro touchpad including a touch sensor provided on an upper surface of each of the plurality of keys, the macro touchpad being adapted to allow at least large-scale pointer or other computer control by moving a finger or other object across a top surface of one or more of the plurality of keys.

12. The keyboard of claim 11, wherein:
    each of the touch sensors provided on each of the plurality of keys comprises a respective micro touchpad, and
    a resolution of the micro touchpad of the first key is greater than a resolution of the micro touchpads in one or more of the plurality of keys used for the macro touchpad.

13. A method of selecting touchpad input and key input, the method comprising:
    determining by a processor, if a key has been pressed;
    determining, by the processor, if touch activity with respect to a touchpad on an upper surface of the key is detected;
    if the key has been pressed, then enabling the key input and disabling the touchpad input, with respect to the touchpad, for a period of time after the key has been pressed;
    otherwise, if the key has been determined to not be pressed, then:
      enabling, by the processor, the touchpad input; and
      if the touch activity with respect to the touchpad is detected by the processor and the key has been determined, by the processor, not to be pressed, then performing:
        buffering, by the processor, the key input temporarily;
        while buffering the key input temporarily as a result of detecting the touch activity and determining that the key has not been pressed, the processor attempting to confirm that the key input should be disabled;
        if the key input is not confirmed as being disabled, the processor providing the temporarily buffered key input to a host processor different from the processor; and
        if the key input is confirmed as being disabled, discarding the temporarily buffered key input.

14. The method of claim 13, wherein
    a resolution of the touchpad on the upper surface of the key is greater than a resolution of a touchpad in at least one other key.

* * * * *

UNITED STATES PATENT AND TRADEMARK OFFICE
CERTIFICATE OF CORRECTION

PATENT NO. : 7,659,887 B2
APPLICATION NO. : 11/254355
DATED : February 9, 2010
INVENTOR(S) : Glen C. Larsen et al.

It is certified that error appears in the above-identified patent and that said Letters Patent is hereby corrected as shown below:

In column 9, line 53, in Claim 5, after "first" insert -- key --.

In column 10, line 2, in Claim 7, after "space" insert -- bar --.

In column 10, line 3, in Claim 7, after "a second" insert -- one --.

In column 10, line 10, in Claim 9, delete "travel" and insert -- travels --, therefor.

In column 10, line 31, in Claim 13, delete "determining" and insert -- determining, --, therefor.

Signed and Sealed this
Tenth Day of May, 2011

David J. Kappos
*Director of the United States Patent and Trademark Office*